Aug. 9, 1966
F. D. SHEA
3,265,433
LOAD VOLUME ADJUSTABLE TRUCK BED
Filed Nov. 27, 1964
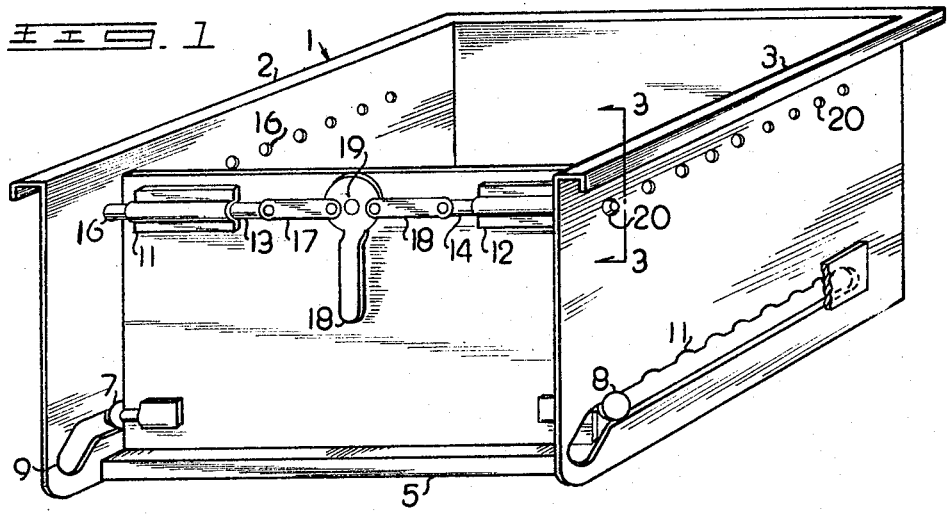
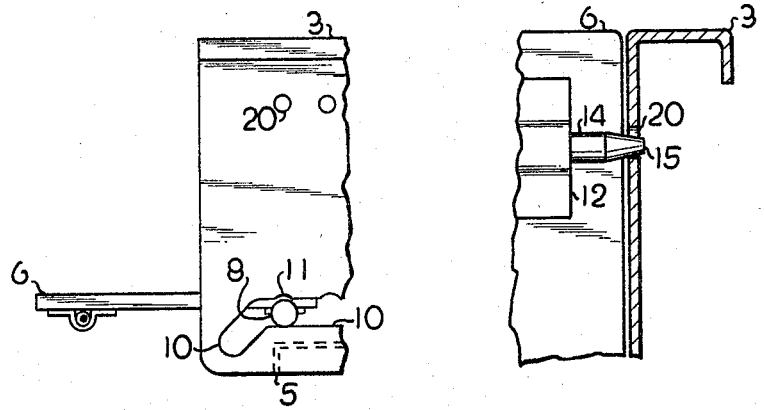
INVENTOR.
FRANCIS D. SHEA

United States Patent Office 3,265,433
Patented August 9, 1966

3,265,433
LOAD VOLUME ADJUSTABLE TRUCK BED
Francis D. Shea, San Diego, Calif.
(4125 Oxford Drive, Columbus 21, Ohio)
Filed Nov. 27, 1964, Ser. No. 414,081
2 Claims. (Cl. 296—57)

My invention generally relates to load volume adjustable truck beds and more particularly to a truck bed that may be adjusted as to volume by moving the tail gate forward and fastening it at various points.

An object of my invention it to provide a truck bed that the volume of carrying capacity may be adjustable and the tail gate may be fastened at various points to accomplish this and that will hold such load in a compact area to prevent spilling about.

These together with other objects and advantages which will become apparent reside in the details of construction and operation as will be more fully described and claimed, reference being made to the accompanying drawing forming a part hereof, wherein like numerals refer to like parts throughout, and in which:

FIGURE 1 is a perspective view of my invention.

FIGURE 2 is a partial elevational view of the tail gate portion of my invention.

FIGURE 3 is a partial cross sectional, elevational view taken at approximately 3—3 of FIGURE 1.

Referring specifically to the drawing, there is provided a generally rectangular shaped truck bed, of metal or other suitable material, for transporting merchandise, material or other objects. The truck bed, FIGURE 1, is closed at the two sides 2 and 3, front 4 and bottom 5. It is provided with a tail gate 6 that is normally used to close the end, but in the case of my invention is provided with two rollers 7 and 8 rotatably mounted near the bottom edge. These rollers extend into slots 9 and 10 in the sides of the truck bed.

A series of equidistantly spaced radiused areas 11 at the upper edge of the slots 9 and 10 are provided. The radiused areas 11, are equal to either of the radii of the rollers 7 or 8.

The tail gate 6 is further provided with brackets 11 and 12, FIGURES 1 and 3, welded or otherwise secured to the tail gate. These brackets have horizontal holes for pins 13 and 14 to be slidably contained therein. These pins have tapered points 15 at one end, FIGURES 1 and 3, and are provided with a hole at the other end. These pins are joined to the hand lever 16 by linkage straps 17 and 18. The hand lever 16 is rotatably mounted to the tail gate 6 by rivet or pin 19.

The two truck bed sides 2 and 3 are each provided with a series of equidistantly spaced holes 20 located in line horizontally. Each such hole is a vertical alignment with each radiused area 11 of the slots 9 and 10.

In operation:

The tail gate is opened by rotating the handle 18 to the right or left thus moving inwardly the positions of the pins 13 and 14 by the linkage straps 17 and 18, until the pins retract from holes 16 and 20.

The tail gate is tilted back toward the operator until it is nearly horizontal and pulled toward the operator so that rollers 7 and 8 move down the angular area of slots 9 and 10 and come to rest at the lower ends.

The tail gate is allowed to drop downward. This leaves the bed of the truck clear for loading.

The load is placed as far forward as possible and the tail gate 6 is forced upward and held approximately horizontal as indicated, FIGURE 2.

The tail gate is now held in alignment by the sides of the truck bed as it is forced forward, and is supported by and moved along on rollers 7 and 8, FIGURE 1, by the hand of the operator holding the outer end.

The tail gate is forced forward as far as possible then raised to vertical position and pressed against the load. The pins 13 and 14 are placed in position so that the tapered points 15 are ready for entry into the corresponding holes 16 and 20 of the truck bed sides 2 and 3.

It will be noted that the extreme end 15 of the pin 14, FIGURE 3, is resting on the bottom of hole 20. As the handle of lever 18 is rotated downward thus causing the two pins to be forced outward into the holes 20, this action causes the tail gate to be lifted up by inclined plane movement of the tapered points of pins 14 and 13.

The resultant raising of tail gate 6 causes the rollers 7 and 8 to become nestled into corresponding radiused areas 11, on both slots 9 and 10. This action fastens the tail gate in rigid, vertical position.

It will be clear that the embodiment of the invention may be used in many ways as well as changed. Such changes will not affect the essence of the invention as described in the annexed claims.

Having illustrated and described my invention, what I claim as new is as follows:

1. In a load volume adjustable truck bed, comprising in combination, a generally rectangular shaped body closed on the forward end, two sides and bottom and having a rectangular shaped tail gate having two rollers one at each side opposite each other near the bottom to rotate in a vertical plane and at 90° with the plane surface of the said tail gate, said rollers fitted to roll along a slot on each side, near the bottom of the truck bed, said tail gate having a pair of pins one on each side, slidably mounted to move horizontally outward into the sides of said truck bed, said pins having holes at the inner ends pivotally connected to linkage straps, said linkage straps pivotally connected at the opposite ends to a levered handle pivotally mounted to the tail gate, so that as the said levered handle is rotated the said pins are both caused to move outwardly into any two of a series of holes provided in the two sides of the truck bed.

2. In a load volume adjustable truck bed, as described in claim 1, and further characterized by having the points of the said pins tapered so that as the said levered handle is rotated downward the taper of the said pin points causes the said pins to enter holes in each side of said truck bed and raise the said tail gate upward by inclined plane action so that the said two rollers at the bottom nestle into two radiused areas and thus fasten the tail gate in rigid upright position.

References Cited by the Examiner
UNITED STATES PATENTS

| | | | |
|---|---|---|---|
| 2,697,631 | 12/1954 | Miller | 280—179 |
| 2,852,303 | 9/1958 | Hopson | 296—26 |
| 3,115,102 | 12/1963 | Rolfe et al. | 280—179 |

BENJAMIN HERSH, *Primary Examiner.*

J. H. BRANNEN, *Assistant Examiner.*